(12) United States Patent
Barnette et al.

(10) Patent No.: US 7,540,746 B2
(45) Date of Patent: Jun. 2, 2009

(54) ELECTRICAL ENCODING OF CABLE TYPES AND CONFIGURATIONS

(75) Inventors: Chris M. Barnette, Richardson, TX (US); Richard Schumacher, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 355 days.

(21) Appl. No.: 11/399,069

(22) Filed: Apr. 6, 2006

(65) Prior Publication Data

US 2007/0238349 A1    Oct. 11, 2007

(51) Int. Cl.
*H01R 12/00* (2006.01)
(52) U.S. Cl. ....................................................... 439/77
(58) Field of Classification Search ................... 439/66, 439/67, 74, 77; 365/145, 149
See application file for complete search history.

(56) References Cited

U.S. PATENT DOCUMENTS 4,206,451 A * 6/1980 Kurschner ................ 340/522
5,943,257 A * 8/1999 Jeon et al. ................ 365/145
6,289,043 B1   9/2001 Kumata

* cited by examiner

Primary Examiner—Jean F Duverne

(57) ABSTRACT

In one embodiment, a system comprises one or more processors, a first circuit assembly having a plurality of circuit traces, a second circuit assembly having a plurality of circuit traces, a cable assembly connecting the plurality of circuit traces on the first circuit assembly to the plurality of circuit traces on the second circuit assembly, signal generating circuitry to generate signal values on one or more of the plurality of circuit traces in the first circuit assembly, and a memory module communicatively connected to the one or more processors and comprising logic instructions which, when executed on the one or more processors configure the one or more processors to compare signal values on one or more of the plurality of circuit traces in the second circuit assembly to an expected signal value.

20 Claims, 6 Drawing Sheets

| Source Device | Expected State |
|---|---|
| Chipset 0001 | 00 |
| Chipset 0002 | 01 |
| Chipset 0003 | 10 |
| Chipset 0004 | 11 |

Fig. 4A

| Source Device | Expected Signal |
|---|---|
| Chipset 0001 | 0110 |
| Chipset 0002 | 1001 |
| Chipset 0003 | 0111 |
| Chipset 0004 | 1110 |
| Chipset 0016 | 1111 |

Fig. 4B

ELECTRICAL ENCODING OF CABLE TYPES AND CONFIGURATIONS

TECHNICAL FIELD

This application relates to electronic computing and more particularly to electrical encoding of cable types and configurations.

BACKGROUND

Many electronic devices include multiple subassemblies such as chips, chipsets, printed circuit assemblies (PCAs) and the like connected by one or more cable assemblies. Many such subassemblies require specific cable interconnects. Many cable assemblies are visibly indistinguishable, which can result in cable assemblies being installed incorrectly. This, in turn, may render the electronic device inoperable.

SUMMARY

In one embodiment, a system comprises one or more processors, a first circuit assembly having a plurality of circuit traces, a second circuit assembly having a plurality of circuit traces, a cable assembly connecting the plurality of circuit traces on the first circuit assembly to the plurality of circuit traces on the second circuit assembly, signal generating circuitry to generate signal values on one or more of the plurality of circuit traces in the first circuit assembly, and a memory module communicatively connected to the one or more processors and comprising logic instructions which, when executed on the one or more processors configure the one or more processors to compare signal values on one or more of the plurality of circuit traces in the second circuit assembly to an expected signal value.

BRIEF DESCRIPTION OF THE DRAWINGS

FIG. 4A is a schematic illustration of one embodiment of a table of expected values.

FIG. 4B is a schematic illustration of one embodiment of a table of expected values.

DETAILED DESCRIPTION

Described herein are exemplary systems and methods for electrical encoding of cable types and configurations that may be used, e.g., in a computer system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods. In alternate embodiments, the methods may be implanted as hard-wired logic circuits, or as logic in a configurable processing device such as, for example, a field programmable gate array (FPGA) or the like. In some implementations the methods may also be executed manually, in whole or in part.

Figure 1:
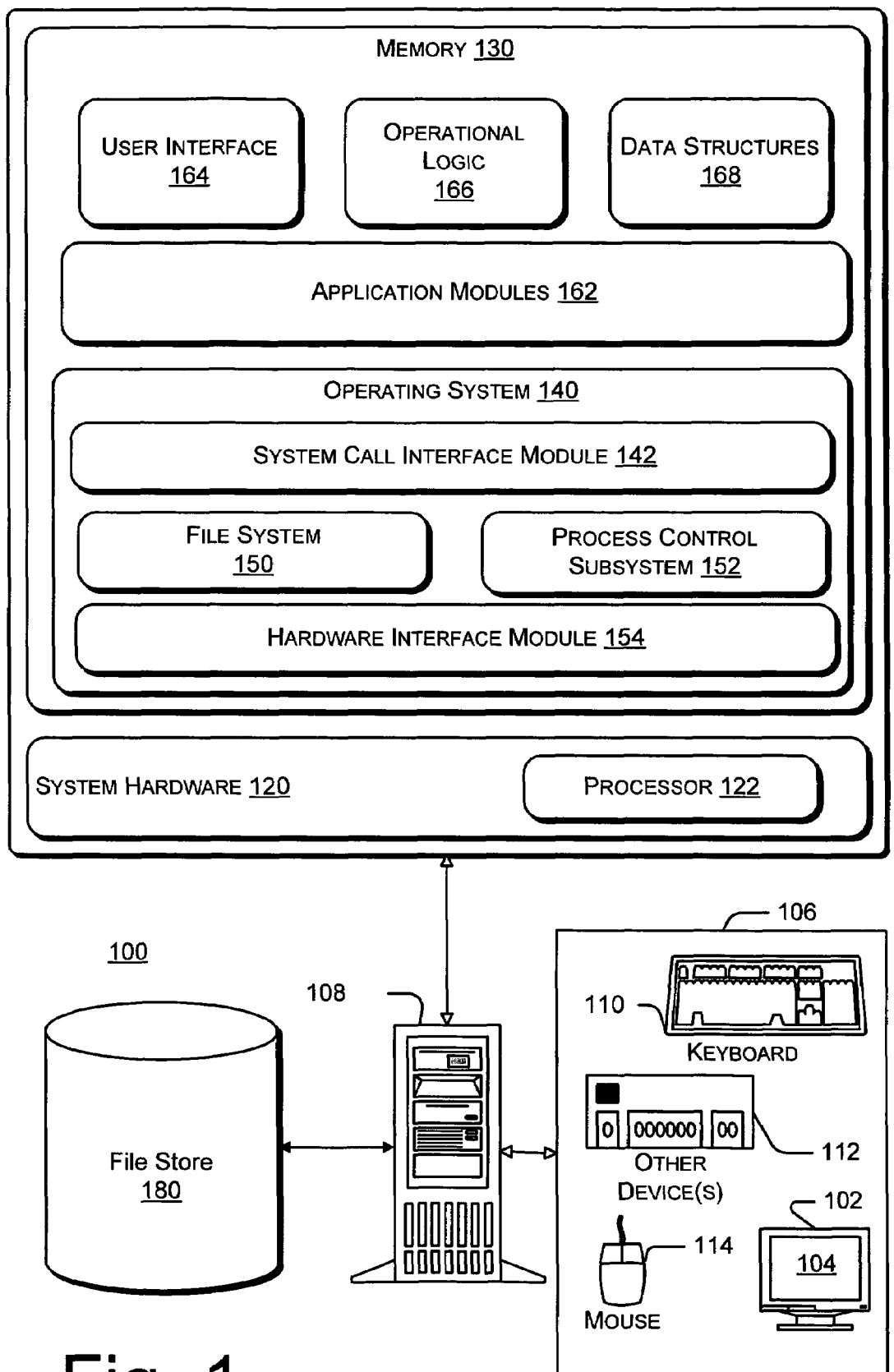
FIG. 1 is a schematic illustration of one embodiment of a computing system adapted to implement electrical encoding of cable types and configurations.

FIG. 1 is a schematic illustration of an exemplary computer system 100 adapted to implement electrical encoding of cable types and configurations. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 may be coupled to computer 108. File store 180 may be internal such as, e.g., one or more hard drives, or external such as, e.g., one or more external hard drives, network attached storage, or a separate storage network.

System hardware 120 may include one or more processors 122. Memory 130 includes an operating system 140 for managing operations of computer 108. In one embodiment, operating system 140 includes a hardware interface module 154 that provides an interface to system hardware 120. In addition, operating system 140 includes one or more file systems 150 that managed files used in the operation of computer 108 and a process control subsystem 152 that manages processes executing on computer 108. Operating system 140 further includes a system call interface module 142 that provides an interface between the operating system 140 and one or more application modules 162.

In operation, one or more application modules 162 and/or libraries 164 executing on computer 108 make calls to the system call interface module 142 to execute one or more commands on the computer's processor. The system call interface module 142 invokes the services of the file systems 150 to manage the files required by the command(s) and the process control subsystem 152 to manage the process required by the command(s). The file system(s) 150 and the process control subsystem 152, in turn, invoke the services of the hardware interface module 154 to interface with the system hardware 120.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In one embodiment, memory 130 may include one or more application modules 162 that execute on operating system 140. The particular operation(s) of application modules 162 are not important to the subject matter described herein. Memory 130 may further include one or more user interface modules 164 that provide a user interface to the one or more application modules 162.

In one embodiment, memory 130 may further include an operational logic module 166 that includes logic instructions which, when executed, configure the one or more processors to implement operations for electrical encoding of cable types and configurations. In alternate embodiments, operational logic module 166 may be implemented in, e.g., the basic input/output system (BIOS) of computing device 130, such that operational logic module 166 is invoked when computing device 100 is activated. In alternate embodiments, operational logic 166 may be implemented in hard-wired circuitry in computing device 100. Operational logic module 166 is explained in greater detail below.

Figure 2A:
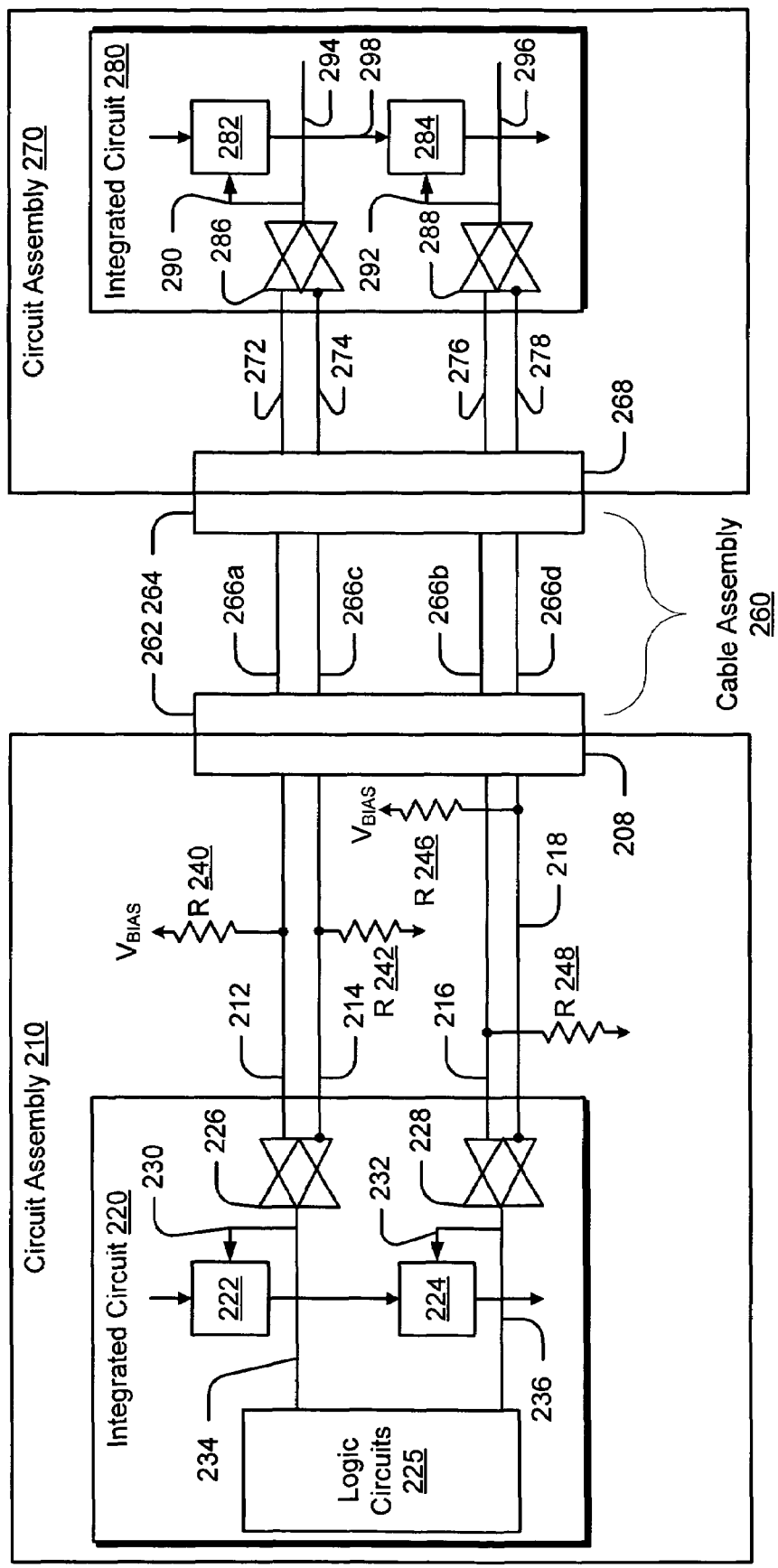
FIG. 2A is a schematic illustration of a first embodiment of a circuit assembly adapted to implement electrical encoding of cable types and configurations.

FIG. 2A illustrates one embodiment in which the channel transceivers (shown as 226, 228 of circuit assembly 210 and 286, 288 of circuit assembly 280) actively participate in sensing the logic values established by the biasing devices (240, 242, 246, 248) on the cable assembly. This is appropriate when the channel transceivers can be guaranteed to be electrically compatible with each other, for example by virtue of mechanical keying of the cable assembly or other means which makes it impossible to connect electrically incompatible transceivers. This class of embodiment may be used when there are many possible electrically compatible but nevertheless incorrect/undesired ways of cabling together multiple circuit assemblies.

Figure 2B:
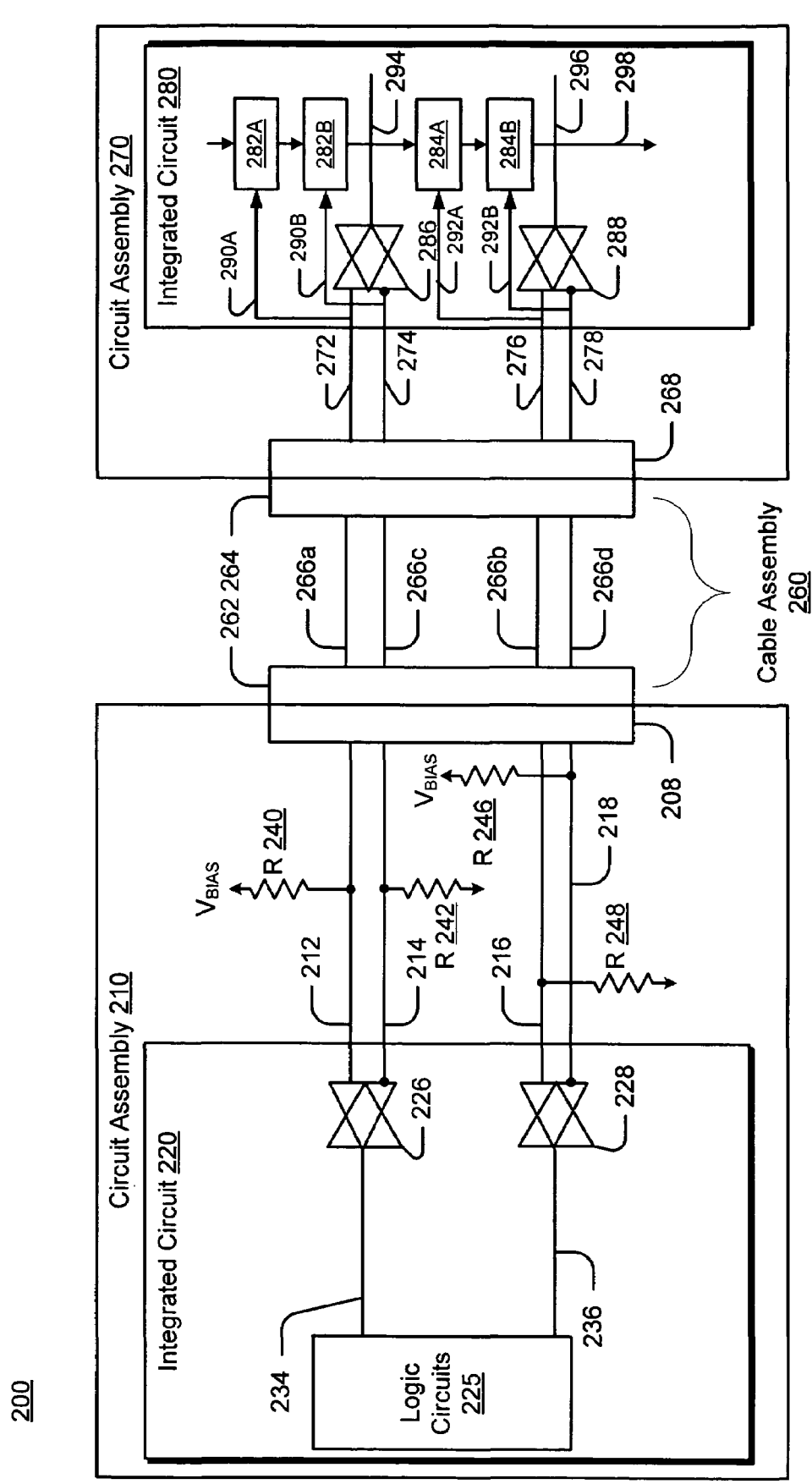
FIG. 2B is a schematic illustration of a second embodiment of a circuit assembly adapted to implement electrical encoding of cable types and configurations.

FIG. 2B is a schematic illustration of one of a class of embodiments in which the channel transceivers do not participate in sensing the logic values established by the biasing devices. For example, in applications in which it is possible to cable together electrically incompatible circuit assemblies, and in which therefore the channel transceivers must not be powered on to participate in the sensing of the cable configuration; or because it is desired to use bias levels appropriate for devices 282A, 282B, 284A, 284B which are incompatible with the normal operation of the channel.

In both of these two general classes many various alternate embodiments are possible. FIGS. 2A and 2B show all signal channels as bi-directional and using differential signaling with bidirectional differential transceiver devices. In other applications any of the channels may be unidirectional using a receiver at one end and a transmitter at the other or any of the channels may use single-ended signaling, or both. FIGS. 2A and 2B show the biasing established by passive devices (e.g., resistors). In other applications the passive biasing devices may be replaced by active devices controlled by additional logic circuits.

Referring first to FIG. 2A, a cable assembly 260 connects one or more chips (or chipsets) 220 on a first circuit assembly 210 to one or more chips (or chipsets) 280 on a second circuit assembly 270. In one embodiment, cable assembly 260 may include a first connector 262 that establishes a physical and electrical connection with a mating connector 208 on first circuit assembly 210, a second connector 264 that establishes a physical and electrical connection with a mating connector 268 on second circuit assembly 270, and one or more cables 266a, 266b, 266c, 266d. The cable assembly 260 depicted in FIG. 2 comprises two connectors 262, 264 and four cables 266a, 266b, 266c, 266d, in other embodiments the cable assembly 260 may include three or more connectors and any numbers of cables 266.

In one embodiment, circuit assembly 210 may include a connector 208 that establishes a physical and electrical connection with mating connector 262 and a plurality of circuit traces 212, 214, 216, 218 that are electrically coupled to cables 266a, 266b, 266c, 266d through connectors 208, 262. Circuit traces 212 and 214 are connected to a transceiver 226 on integrated circuit 220. Circuit traces 216 and 218 are connected to a transceiver 228 in integrated circuit 220. Receiver 226 generates an output signal on circuit trace 234, and receiver 228 generates an output signal on circuit trace 236. The output signals on circuit traces 234, 236 may be directed to additional logic circuits 225 on integrated circuit 220.

In one embodiment, circuit trace 234 may be connected to a look aside register 222 by circuit trace 230. Similarly, circuit trace 236 may be connected to a look aside register 224 by a circuit trace 232. Look aside registers 222, 224 may be used to store the logical state of the signal on circuit traces 234, 236, respectively. Look aside registers 222, 224 may be omitted in some embodiments.

In one embodiment, circuit assembly 270 may include a connector 268 that establishes a physical and electrical connection with mating connector 264 and a plurality of circuit traces 272, 274, 276, 278 that are electrically coupled to cables 266a, 266b, 266c, 266d through connectors 268, 264. Circuit traces 272 and 274 are connected to a transceiver 286 on integrated circuit 270. Circuit traces 276 and 278 are connected to a transceiver 288 in integrated circuit 270. Receiver 286 generates an output signal on circuit trace 294, and receiver 288 generates an output signal on circuit trace 296. The output signals on circuit traces 294, 296 may be directed to additional logic circuits on integrated circuit 280.

Circuit trace 294 may be connected to a look aside register 282 by circuit trace 290. Similarly, circuit trace 296 may be connected to a look aside register 284 by a circuit trace 292. Look aside registers 282, 284 may be used to store the logical state of the signal on circuit traces 294, 296, respectively.

At least one of circuit assembly 210 or circuit assembly 270 may include circuitry to generate one or more signals for electrical encoding of cable types and configurations. For purposes of description, in the embodiment depicted in FIG. 2, circuit assembly 210 functions as an encoding signal transmitter, and circuit assembly 270 functions as an encoding signal receiver. Thus, in the embodiment depicted in FIG. 2, circuit assembly 210 includes circuitry that applies bias voltages to circuit traces 212, 214, 216, 218 to generate one or more signals that may be used to identify characteristics of the circuit assembly 210 such as, for example, the type of circuit assembly, the type of one or more integrated circuits 220, the type of computing device in which circuit assembly 210 resides, electrical characteristics of circuit assembly 210 or components thereof, or the like. The signals are transmitted to circuit assembly 270 via cable assembly 260. The signals are input to receivers 288, 286, which generate an output signal on lines 294 and 296. Indicia of the output signals on lines 294 and 296 may be stored in look aside registers 282, 284. Logic associated with circuit assembly 270 may compare the output signals in look aside registers 282, 284 with signal patterns stored, e.g., in a memory module communicatively coupled with circuit assembly to determine whether the values in look aside registers 282, 284 correspond to expected values.

In the embodiment depicted in FIG. 2A, a bias voltage $V_{BIAS}$ is applied to circuit trace 212 and 216 by resistors 240, 246, respectively, to pull the voltage on circuit traces 212 and 216 to a logical high value. The particular value of $V_{BIAS}$ is a matter of design choice. $V_{BIAS}$ may be selected such that it is above a voltage threshold in the circuitry 226, 228, 286, 288. Similarly, circuit traces 214 and 218 are pulled to a logic low by resistors 242, 248, respectively. Resistors 242, 248 may be connected to ground or to a logic low voltage. The biasing may be accomplished so that it does not interfere with the normal operation of the signal channel (for example by presenting high impedance, or the like.).

The signals on circuit traces 212, 214, 216, 218 are conducted via cable assembly 260 to circuit traces 272, 274, 276, 278 and to receivers 286, 288. The output from receivers 286, 288 is input to look aside register 282, 284.

The values stored in the look aside registers 282, 284 may be detected at circuit assembly 270, e.g., by channel signal receivers, signal scanners, or the like. The values stored in the look aside registers may then be compared to a table of expected values to determine whether the circuit assembly 210, cable assembly 260, and circuit assembly 270 are connected correctly.

Figure 3:
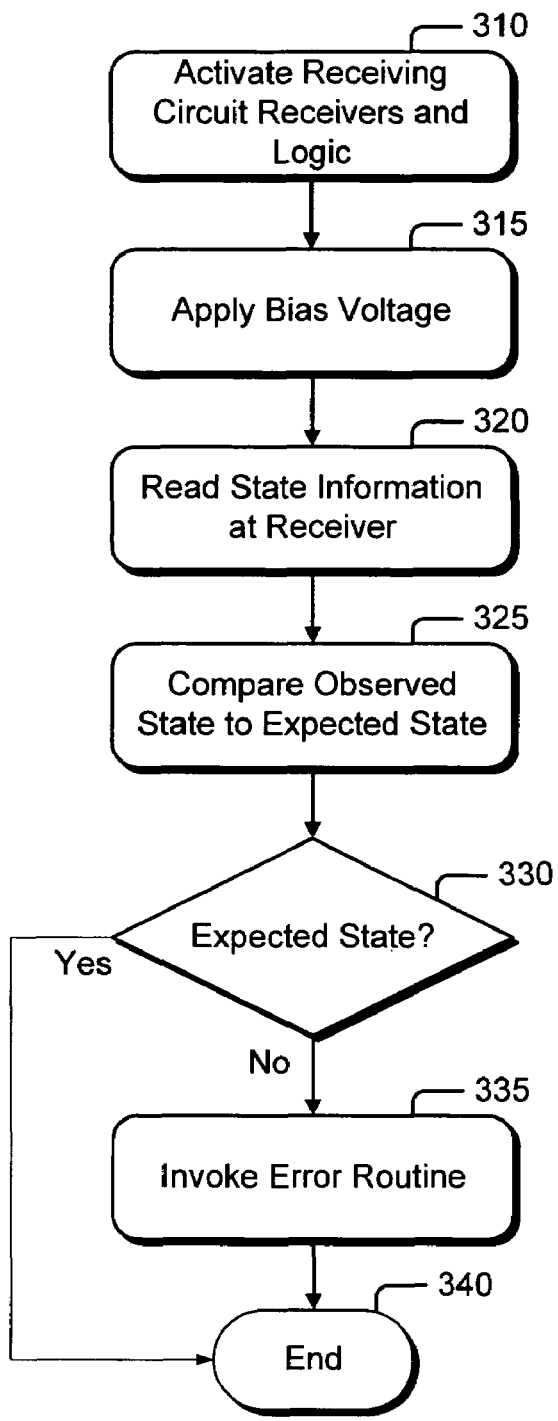
FIG. 3 is a flowchart illustrating operations in one embodiment of a computing system adapted to implement electrical encoding of cable types and configurations.

FIG. 3 is a flowchart illustrating operations in one embodiment of a computing system adapted to implement electrical encoding of cable types and configurations. Referring briefly to FIG. 3, at operation 310 receivers and logic on the receiving circuit assembly 270 are activated. In one embodiment activating the receiving circuit assembly receivers and logic may include activating an electronic device into which the receiving circuit assembly is placed. In alternate embodiments, the receiving circuit assembly 270 may be activated independently of the electronic device into which the receiving circuit assembly 270 is to be incorporated.

At operation 315, a bias voltage is applied to one or more lines in the transmitting circuit assembly 210. In one embodiment, the bias voltage may be applied by pull-up or pull-down resistors 240, 242, 246, 248. Bias voltages generate a signal one or more circuit traces 212, 214, 216, 218, which are transmitted by cable assembly 260 to receiving circuit assembly 270. The signals on circuit traces 212, 214, 216, 218 are input to receivers 286, 288, which generate an output on circuit traces 294, 296. The output values may be stored in look-aside registers 282, 284.

At operation 320, state information is read from the receiving circuit assembly 270. In one embodiment, reading the state information may include reading the values stored in state registers 282, 284. At operation 325 the state information read from the receiving circuit assembly 270 is compared to an expected state value. In one embodiment a table of expected state values may be stored in a memory location coupled to receiving circuit assembly 270. FIG. 4A is a schematic illustration of one embodiment of a table of expected values. Referring briefly to FIG. 4A, a memory table may comprise a listing that correlates a source device (i.e., a transmitting circuit assembly 210) with an expected logical state in registers 282, 284 of receiving circuit 270.

Referring back to FIG. 3, if, at operation 330, the logical state stored in look-aside registers 282, 284 corresponds to the expected logical state, then control passes to operation 340 and the procedure ends. By contrast, if the state in registers 282, 284 does not correspond to the expected logical state, the control passes to operation 335 and an error routine may be invoked. In one embodiment, the error routine may include generating a signal that indicates that the receiving circuit assembly did not receive a signal. The signal may be presented via a suitable interface such as e.g., a light-emitting diode (LED), a display, or an audio device such as a speaker, or a combination thereof. In alternate embodiments, the error routine may include disabling an electronic device in which the circuit assembly 270 is installed. In one embodiment, logic for implementing the error routine may be incorporated into receiving circuit assembly 270, such that no outside processing capability is required to implement the error routine. In alternate embodiments, logic for implementing the error routine may be embodied as logic instructions stored in a memory module of a suitable computing device and executable by a processor.

FIG. 2B is a schematic illustration of a second embodiment of a circuit assembly adapted to implement electrical encoding of cable types and configurations. Most of the components illustrated in FIG. 2B are the same as the components illustrated in FIG. 2A. The description for like components will not be repeated.

Referring to FIG. 2B, circuit assembly 210 operates as a transmitting circuit, and therefore does not require look-aside registers. The receiving circuit assembly 270 includes four look aside registers 282A, 282B, 284A, 284B, which store a logical value sampled from 272, 274, 276, 278, respectively. This permits a four-digit binary sampling value to be obtained, which allows for a greater number of cable configurations to be confirmed. FIG. 4B is a schematic illustration of one embodiment of a table of expected values that may be used in connection with the embodiment depicted in FIG. 2B. Referring briefly to FIG. 4B, a memory table may comprise a listing that correlates a source device (i.e., a transmitting circuit assembly 210) with an expected logical state in registers 282, 284 of receiving circuit 270. As illustrated in FIG. 4B, the state table may hold up to sixteen (16) different values.

The circuit configurations depicted in FIGS. 2A and 2B may be adapted to monitor a larger number of cables, thereby providing an even larger number of coding possibilities that may be encoded in a memory table such as the tables depicted in FIGS. 4A and 4B.

Numerous alternate embodiments may be implemented. For example, in alternate embodiments the bias devices may be disposed in the cable assembly 260 rather than in the first circuit assembly 210. This may reduce the number of channel signal paths available in the circuit assemblies.

In some embodiments the channel signal paths may use a transmission line termination (e.g., a resistor coupled to a termination voltage), which may obscure the bias voltage applied to a line. In such a case, the transmission line termination may be removed, converted to a high-impedance or otherwise disabled while the bias is being detected at the receiving circuit assembly 270. In other embodiments, the bias devices may constitute the channel signal terminations, which may reduce the number of bias states available.

In other embodiments, bias sources may provide sufficient current to set the bias voltages even though channel signal termination devices remain active. This enables placement of termination devices in a way that optimizes the signal paths by minimizing impedance discontinuities, loading, and the like. In such case, bias devices may need to be disabled after the configuration test is complete to permit channel signaling to be applied to the circuit traces.

In other embodiments, bias sources may apply signals having more than two voltage levels to increase the number of available bias states on the various circuit traces.

Figure 5:
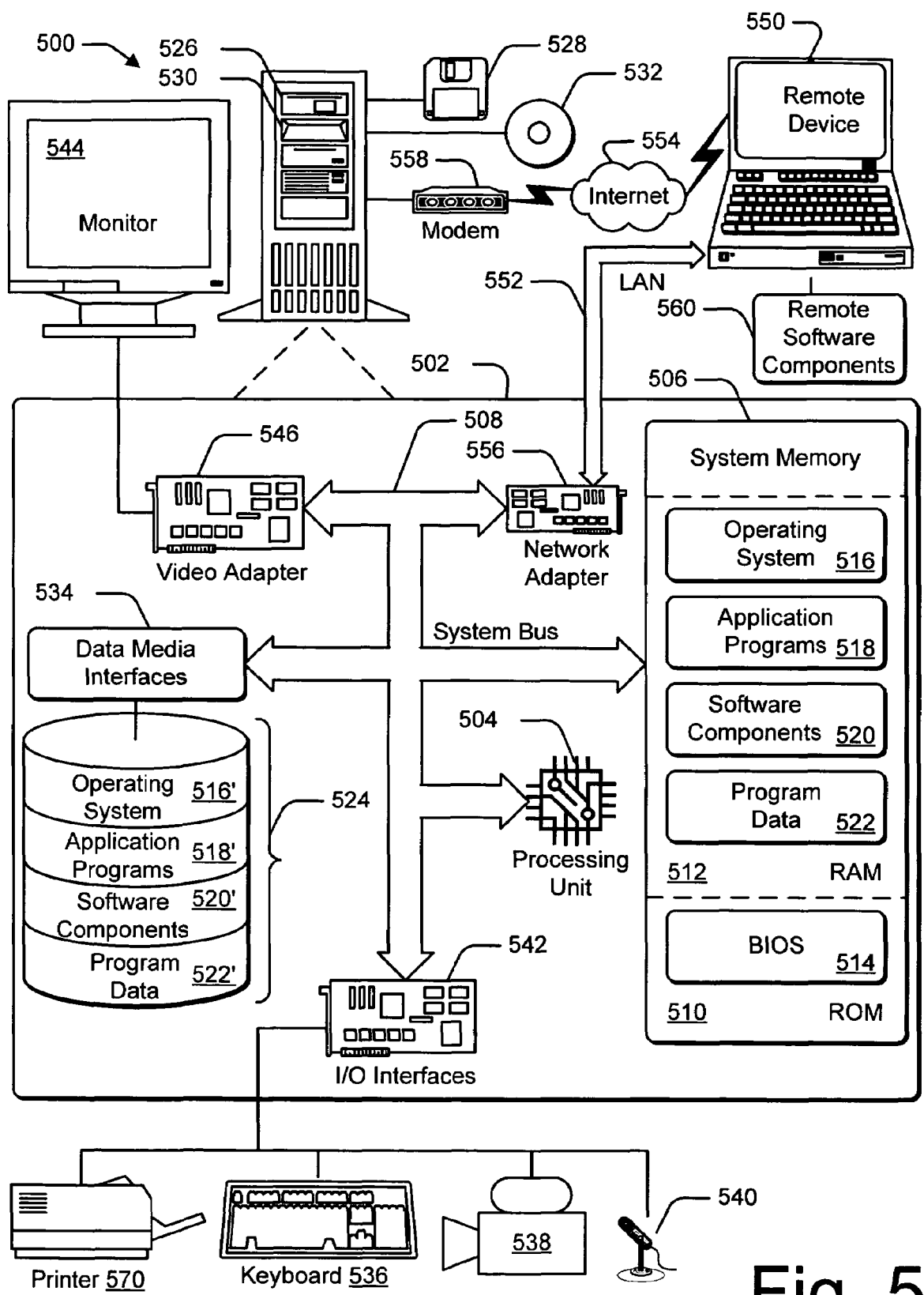
FIG. 5 is a schematic illustration of a computing environment according to an embodiment.

The various components and functionality described herein are implemented with a number of individual computers. FIG. 5 shows components of typical example of such a computer, referred by to reference numeral 500. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 5, the components of computer 500 may include, but are not limited to, a processing unit 504, a system memory 506, and a system bus 508 that couples various system components including the system memory 506 to the processing unit 504. The system bus 508 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 500 typically includes a variety of computer-readable media. Computer-readable media can be any available media that can be accessed by computer 500 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 506 includes computer storage media in the form of volatile and/or nonvolatile memory such as read only memory (ROM) 510 and random access memory (RAM) 512. A basic input/output system 514 (BIOS), containing the basic routines that help to transfer information between elements within computer 500, such as during start-up, is typically stored in ROM 510. RAM 512 typically contains data and/or program modules that are immediately accessible to and/or presently being operated on by processing unit 504. By way of example, and not limitation, FIG. 5 illustrates operating system 516, application programs 518, other software components 520, and program data 522.

The computer 500 may also include other removable/non-removable, volatile/nonvolatile computer storage media. By way of example only, the computer system of FIG. 5 may include a hard disk drive 524 that reads from or writes to non-removable, nonvolatile magnetic media, a magnetic disk drive 526 that reads from or writes to a removable, nonvolatile magnetic disk 528, and an optical disk drive 530 that reads from or writes to a removable, nonvolatile optical disk 532 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 524 is typically connected to the system bus 508 through a non-removable memory interface such as data media interface 534, and magnetic disk drive 526 and optical disk drive 530 are typically connected to the system bus 508 by a removable memory interface.

The drives and their associated computer storage media discussed above and illustrated in FIG. 5 provide storage of computer-readable instructions, data structures, program modules, and other data for computer 500. In FIG. 5, for example, hard disk drive 524 is illustrated as storing operating system 516', application programs 518', software components 520', and program data 522'. Note that these components can either be the same as or different from operating system 516, application programs 518, software components 520, and program data 522. Operating system 516, application programs 518, other program modules 520, and program data 522 are given different numbers here to illustrate that, at a minimum, they are different copies. A user may enter commands and information into the computer 500 through input devices such as a keyboard 536 and pointing device 538, commonly referred to as a mouse, trackball, or touch pad. Other input devices (not shown) may include a microphone 540, joystick, game pad, satellite dish, scanner, or the like. These and other input devices are often connected to the processing unit 504 through an input/output (I/O) interface 542 that is coupled to the system bus, but may be connected by other interface and bus structures, such as a parallel port, game port, or a universal serial bus (USB). A monitor 544 or other type of display device is also connected to the system bus 506 via an interface, such as a video adapter 546. In addition to the monitor 544, computers may also include other peripheral output devices (e.g., speakers) and one or more printers 570, which may be connected through the I/O interface 542.

The computer may operate in a networked environment using logical connections to one or more remote computers, such as a remote computing device 550. The remote computing device 550 may be a personal computer, a server, a router, a network PC, a peer device or other common network node, and typically includes many or all of the elements described above relative to computer 500. The logical connections depicted in FIG. 5 include a local area network (LAN) 552 and a wide area network (WAN) 554. Although the WAN 554 shown in FIG. 5 is the Internet, the WAN 554 may also include other networks. Such networking environments are commonplace in offices, enterprise-wide computer networks, intranets, and the like.

When used in a LAN networking environment, the computer 500 is connected to the LAN 552 through a network interface or adapter 556. When used in a WAN networking environment, the computer 500 typically includes a modem 558 or other means for establishing communications over the Internet 554. The modem 558, which may be internal or external, may be connected to the system bus 508 via the I/O interface 542, or other appropriate mechanism. In a networked environment, program modules depicted relative to the computer 500, or portions thereof, may be stored in the remote computing device 550. By way of example, and not limitation, FIG. 5 illustrates remote application programs 560 as residing on remote computing device 550. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A system, comprising:
   a first circuit assembly having a plurality of circuit traces;
   a second circuit assembly having a plurality of circuit traces;
   a cable assembly connecting the plurality of circuit traces on the first circuit assembly to the plurality of circuit traces on the second circuit assembly;
   signal generating circuitry to generate signal values on one or more of the plurality of circuit traces in the first circuit assembly; and
   an operational logic module to compare signal values on one or more of the plurality of circuit traces in the second circuit assembly to an expected signal value.

2. The system of claim 1, wherein the signal generating circuitry to generate signal values on one or more of the plurality of circuit traces in the first circuit assembly comprises one or more bias voltage devices connected to one or more of the plurality of circuit traces.

3. The system of claim 1, wherein the an operational logic module comprises:
   logic to detect a signal level on one or more of the plurality of circuit traces in the second circuit assembly; and
   logic to compare the signal level to a reference signal level stored in a memory location.

4. The system of claim 3, wherein the logic to detect a signal level on one or more of the plurality of circuit traces comprises a look-aside register to store a signal level on one or more of the plurality of circuit traces.

5. The system of claim 3, wherein the logic to compare the signal level to a reference signal level stored in a memory location comprises logic to retrieve an expected signal value from a data table.

6. The system of claim 1, further comprising logic to activate an error routine when one or more signal values on one or more of the plurality of circuit traces in the second circuit assembly fails to match an expected signal value.

7. The system of claim 5, wherein the error routine generates a signal when the cable assembly in installed incorrectly.

8. A computing system, comprising:
   one or more processors;
   a first circuit assembly having a plurality of circuit traces;
   a second circuit assembly having a plurality of circuit traces;
   a cable assembly connecting the plurality of circuit traces on the first circuit assembly to the plurality of circuit traces on the second circuit assembly;
   signal generating circuitry to generate signal values on one or more of the plurality of circuit traces in the first circuit assembly; and
   a memory module communicatively connected to the one or more processors and comprising logic instructions which, when executed on the one or more processors configure the one or more processors to compare signal values on one or more of the plurality of circuit traces in the second circuit assembly to an expected signal value.

9. The computing system of claim 8, wherein the signal generating circuitry to generate signal values on one or more of the plurality of circuit traces in the first circuit assembly comprises one or more bias voltage devices connected to one or more of the plurality of circuit traces.

10. The computing system of claim 8, wherein the further comprising:
    logic to detect a signal level on one or more of the plurality of circuit traces in the second circuit assembly; and
    logic instructions which, when executed, configure the processor to compare the signal level to a reference signal level stored in a memory location.

11. The computing system of claim 10, wherein the logic to detect a signal level on one or more of the plurality of circuit traces comprises a look-aside register to store a signal level on one or more of the plurality of circuit traces.

12. The computing system of claim 10, further comprising logic instructions which, when executed, retrieve an expected signal value from a data table.

13. The computing system of claim 8, further comprising logic to activate an error routine when one or more signal values on one or more of the plurality of circuit traces in the second circuit assembly fails to match an expected signal value.

14. The computing system of claim 12, wherein the error routine generates a signal when the cable assembly in installed incorrectly.

15. A method, comprising:
connecting a first circuit assembly having a plurality of circuit traces to a second circuit assembly having a plurality of circuit traces;
generating signal values on one or more of the plurality of circuit traces in the first circuit assembly;
receiving the signal values on one or more circuit traces in the second circuit assembly; and
comparing signal values on one or more of the plurality of circuit traces in the second circuit assembly to an expected signal value.

16. The method of claim 15, wherein generating signal values on one or more of the plurality of circuit traces in the first circuit assembly comprises applying one or bias voltages to one or more of the plurality of circuit traces.

17. The method of claim 15, wherein comparing signal values on one or more of the plurality of circuit traces in the second circuit assembly to an expected signal value comprises:
detecting a signal level on one or more of the plurality of circuit traces in the second circuit assembly; and
comparing the signal level to a reference signal level stored in a memory location.

18. The method of claim 15, wherein detecting a signal level on one or more of the plurality of circuit traces further comprises reading a signal level on one or more of the plurality of circuit traces from a look-aside register.

19. The method of claim 15, further comprising activating an error routine when one or more signal values on one or more of the plurality of circuit traces in the second circuit assembly fails to match an expected signal value.

20. The method of claim 19, wherein the error routine generates a signal when the cable assembly in installed incorrectly.

* * * * *

UNITED STATES PATENT AND TRADEMARK OFFICE
CERTIFICATE OF CORRECTION

PATENT NO. : 7,540,746 B2  Page 1 of 1
APPLICATION NO. : 11/399069
DATED : June 2, 2009
INVENTOR(S) : Chris M. Barnette et al.

It is certified that error appears in the above-identified patent and that said Letters Patent is hereby corrected as shown below:

In column 10, line 9, in Claim 3, delete "the an" and insert -- the --, therefor.

In column 10, line 28, in Claim 7, delete "assembly in" and insert -- assembly is --, therefor.

In column 11, line 5, in Claim 14, delete "assembly in" and insert -- assembly is --, therefor.

In column 12, line 21, in Claim 20, delete "assembly in" and insert -- assembly is --, therefor.

Signed and Sealed this

Twenty-second Day of September, 2009

David J. Kappos
*Director of the United States Patent and Trademark Office*